US007025258B2

(12) United States Patent
Chang

(10) Patent No.: US 7,025,258 B2
(45) Date of Patent: Apr. 11, 2006

(54) BALL BEARING ACTUATION MECHANISM

(76) Inventor: Kil Jae Chang, T. Pico, Korea Manufacturing, 321-37 Suksu, 2 Dong, Anyang City, Kyungdido (KR)

( * ) Notice: Subject to any disclaimer, the term of this patent is extended or adjusted under 35 U.S.C. 154(b) by 57 days.

(21) Appl. No.: 10/798,075

(22) Filed: Mar. 11, 2004

(65) Prior Publication Data

US 2004/0206770 A1 Oct. 21, 2004

Related U.S. Application Data

(60) Provisional application No. 60/463,253, filed on Apr. 16, 2003.

(51) Int. Cl.
*G06F 7/08* (2006.01)

(52) U.S. Cl. .......................... 235/381; 235/18; 235/68; 194/205; 194/215; 194/226; 194/229; 194/344; 221/206; 221/265; 221/277

(58) Field of Classification Search ................ 235/381, 235/18, 68; 194/344, 229, 205, 215, 225, 194/226, 232, 237; 221/277, 2, 7, 206, 207, 221/265, 296, 289
See application file for complete search history.

(56) References Cited

U.S. PATENT DOCUMENTS 862,923 A * 8/1907 Linsley ....................... 221/296
1,008,862 A * 11/1911 Poyet .......................... 235/18
1,438,189 A * 12/1922 Perdue et al. ............... 221/265
1,505,366 A * 8/1924 Barr ............................ 235/68
1,941,191 A * 12/1933 Schwegler .................. 194/225
1,961,147 A * 6/1934 Harris .................... 273/119 R
3,233,081 A * 2/1966 Charron ....................... 235/68
3,410,453 A * 11/1968 Joseph ....................... 221/296
3,880,322 A * 4/1975 Shreev ....................... 221/296
5,014,877 A * 5/1991 Roos .......................... 221/265
5,195,652 A * 3/1993 Hooghiemstra ............. 221/277
5,372,277 A * 12/1994 Waring ........................ 221/68

FOREIGN PATENT DOCUMENTS

JP 58-47995 A * 3/1983

* cited by examiner

*Primary Examiner*—Jared J. Fureman
(74) *Attorney, Agent, or Firm*—John R. Flanagan

(57) ABSTRACT

A ball bearing actuation mechanism includes a circular gauge wheel rotatably mounted in an interior chamber of a housing below an inlet passage and adjacent to outlet and overflow discharge openings of the housing and a curved retainer wall mounted to the housing in the interior chamber adjacent to a peripheral groove on the gauge wheel so as to form a channel therebetween which extends between the inlet passage and discharge outlet opening of the housing. The peripheral groove has a length preset to receive a preset number of ball bearings in single file fashion therein when the ball bearings are deposited into interior chamber via the inlet passage such that any ball bearings above the preset number deposited into the inlet passage of the housing will divert to the overflow discharge outlet of the housing.

10 Claims, 6 Drawing Sheets

BALL BEARING ACTUATION MECHANISM

This patent application claims the benefit of U.S. provisional application No. 60/463,253, filed Apr. 16, 2003.

TECHNICAL FIELD

The present invention generally relates to vending machines and, more particularly, is concerned with a ball bearing actuation mechanism for a vending machine or the like.

BACKGROUND ART

Gaming machines, such as slot machines, in casinos in Japan require the utilization of ball bearings for their operation. Thus players of such machines carry around a bag or container of ball bearings, instead of coins, for insertion into the various gaming machines.

As a consequence of the use of ball bearings by the gaming machines, vending machines in the casinos which are accessed by these players to buy products, such as lollipops and other items, for use while they are operating the gaming machines must likewise utilize ball bearings, instead of coins, for making these purchases. For making purchases of different products, different numbers of ball bearings must be deposited into the vending machines, requiring the players to count the individual ball bearings as they are deposited into the vending machines.

This requirement is a problem for the players in that it takes concentration and time and thus constitutes a considerable annoyance for most players. Consequently, there is a continuing need for further innovations that will overcome these drawbacks.

DISCLOSURE OF INVENTION

The present invention provides a ball bearing actuation mechanism for a vending machine which is designed to satisfy the aforementioned need. The actuation mechanism is designed to allow a quantity of ball bearings to be deposited into the actuation mechanism without counting them to ensure that the correct preset number is deposited. Any deposited ball bearings in excess of the correct preset number are automatically diverted to an overflow location where they are returned to the player.

Accordingly, the present invention is directed to a ball bearing actuation mechanism for a vending machine which comprises: (a) a housing having an interior chamber, outlet and overflow discharge openings communicating with said interior chamber, and an inlet passage communicating from exteriorly of the housing to the interior chamber so as to permit deposit of ball bearings one-at-a-time into the interior chamber via the inlet passage; (b) a gauge wheel rotatably mounted in the interior chamber of the housing below the inlet passage and adjacent to the outlet and overflow discharge openings of the housing, the gauge wheel being circular in shape and having a peripheral groove defined about a peripheral portion of the gauge wheel; (c) a retainer wall having a curved configuration and stationarily mounted to the housing in the interior chamber adjacent to and spaced from the peripheral groove of the gauge wheel so as to overlie the peripheral groove and form a channel between the peripheral groove and the retainer wall which extends between the inlet passage and the discharge outlet opening of the housing, the peripheral groove having a predetermined length preset to receive a preset number of ball bearings in single file fashion therein when the ball bearings are deposited into the interior chamber via the inlet passage such that any ball bearings above the preset number deposited into the inlet passage of the housing will divert to the overflow discharge outlet of the housing; and (d) means for rotating the gauge wheel in a predetermined one direction extending from the inlet passage to the discharge outlet opening of the housing in response to deposit of ball bearings equal to the preset number thereof in the channel such that the preset number of ball bearings move with the gauge wheel and discharge from the channel through the discharge outlet opening in the housing.

The actuation mechanism further comprises means for preventing rotation of the gauge wheel until the number of ball bearings equal to the preset number thereof fill the channel. The actuation mechanism also comprises an overflow collection receptacle disposed adjacent to the overflow discharge opening of the housing for receiving in the receptacle any ball bearings above the preset number thereof deposited into the inlet passage of the housing and exiting the interior chamber through the overflow discharge opening of the housing.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Figure 1:
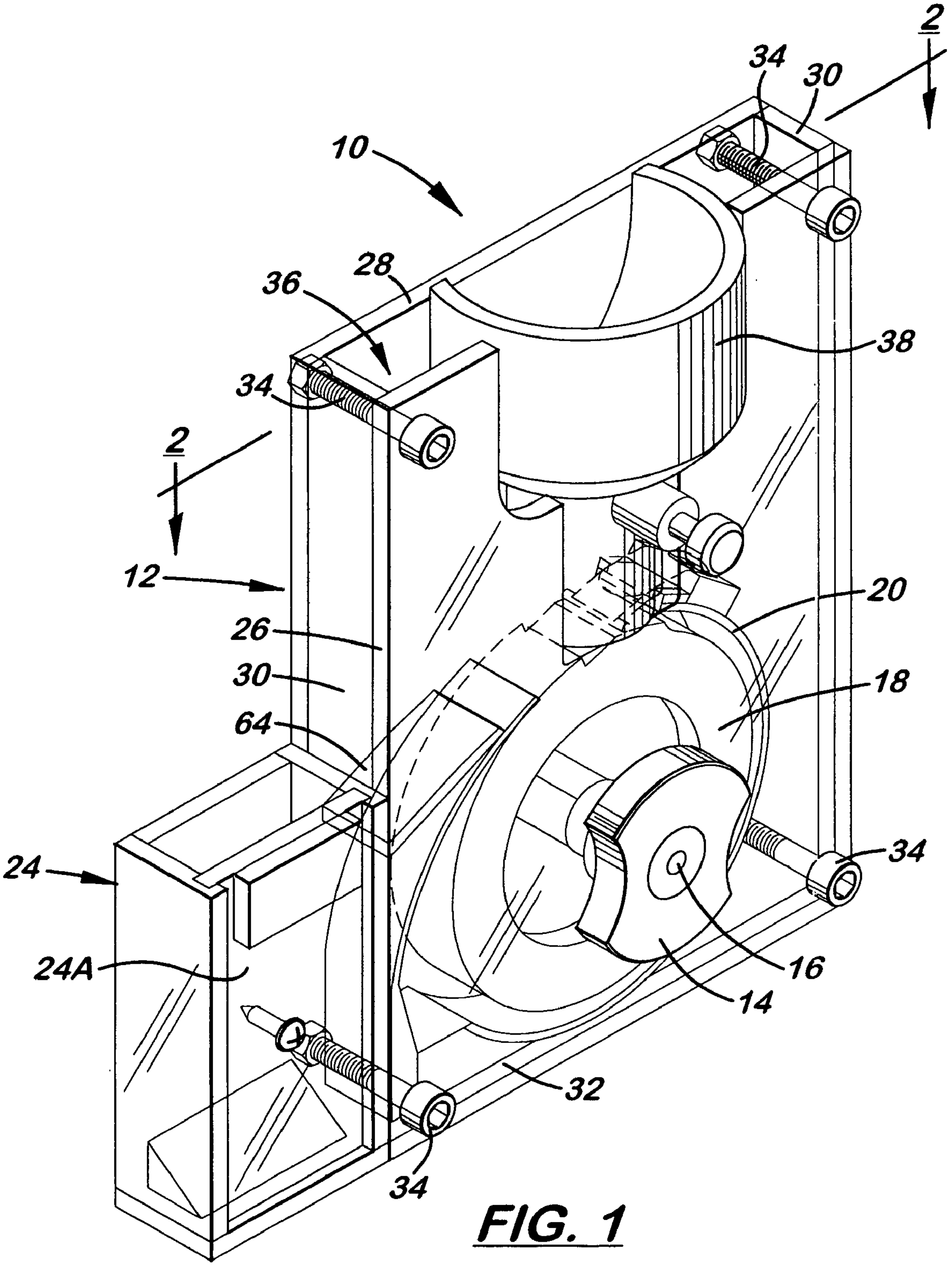
FIG. 1 is a perspective view of a ball bearing actuation mechanism of the present invention.
Figure 2:
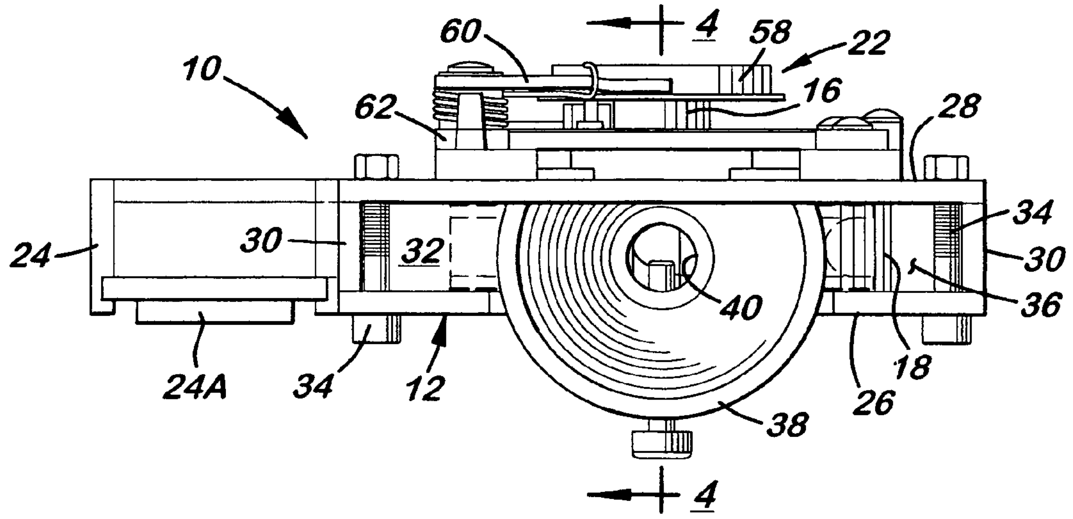
FIG. 2 is a top plan view of the actuation mechanism as seen along line 2—2 of FIG. 1.
Figure 3:
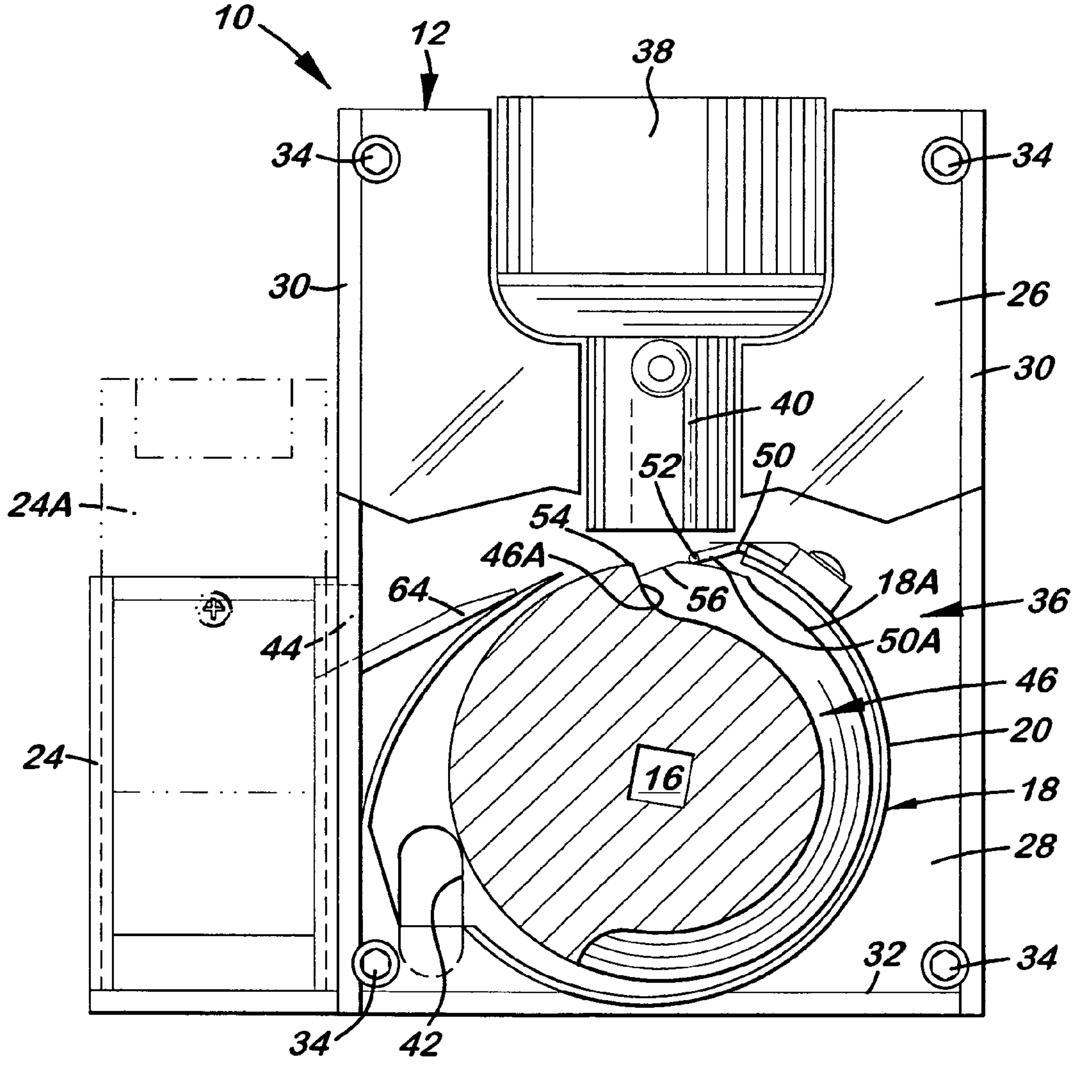
FIG. 3 is a front side elevational view of the actuation mechanism of FIG. 1 with a lower portion of a housing broken away and a gauge wheel of the mechanism shown in sectional form.

Referring to the drawings, and particularly to FIGS. 1 to 5, there is illustrated a ball bearing actuation mechanism of the present invention, generally designated 10, for a vending machine (not shown). The ball bearing actuation mechanism 10 basically includes a housing 12, a handle 14 with an elongated shaft 16, a gauge wheel 18, a curved retaining wall 20, a one-way ratchet 22 and an overflow collection receptacle 24.

The housing 12 of the actuation mechanism 10 has upright front and rear walls 26, 28, upright opposite side walls 30 extending between the front and rear walls 26, 28 and a horizontal bottom wall 32 extending between the front, rear and side walls 26, 28, 30. A plurality of fasteners 34 extend between the front and rear walls 26, 28 of the housing 12 adjacent to its respective corners so as to secure the walls 26–32 together such that the housing 12 forms an interior chamber 36.

A hopper 38 is supported by the housing 12 between upper portions of the front and rear walls 26, 28 thereof. The hopper 38 forms an inlet passage 40 which communicates from the exterior of the housing 12 to the interior chamber 36 thereof permitting depositing of ball bearings B into the inlet passage 40. It should be pointed out here that the term "ball bearings" as used herein encompasses any suitable hemispherical or ball-shaped element. Outlet and overflow discharge openings 42, 44 are formed respectively in the rear wall 28 and in one of the side walls 30 of the housing 12. The openings 42, 44 also communicate with the interior chamber 36.

The handle 14 is fixedly mounted to and on a front end 16A of the shaft 16 and is disposed at the exterior of the front wall 26 of the housing 12. The shaft 16 extends transversely through the front and rear walls 26, 28 of the housing 12 and across the interior chamber 36 thereof. The gauge wheel 18 is disposed in the interior chamber 36 of the housing 12 below the hopper 38 and inlet passage 40 and between lower portions of the front and rear walls 26, 28 of the housing 12 and between the inlet passage 40 and the outlet and overflow discharge openings 42, 44 of the housing 12. The gauge wheel 18 is also disposed over and fixedly mounted to the shaft 16 for undergoing rotation with the shaft 16 upon turning of the handle 14 by a user. The gauge wheel 18 is circular in shape and is provided with a peripheral groove 46 defined about a portion of the periphery of the gauge wheel 18. The curved retainer wall 20 is mounted between and to the front and rear walls 26, 28 of the housing 12 adjacent to and spaced from the periphery of the gauge wheel 18 in the housing 12 so as to overlie the peripheral groove 46 and formed a channel 48 therebetween.

Figure 9:
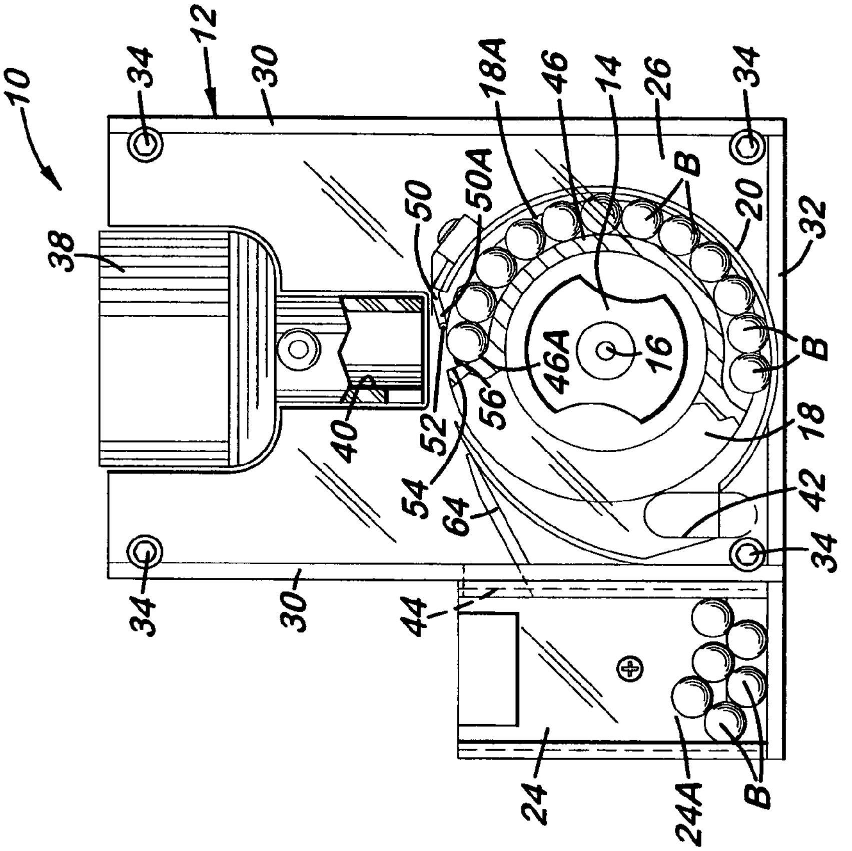

Referring also to FIGS. 6–10, the peripheral groove 46 has a predetermined length preset such that it will receive a desired or preset number of ball bearings B in single file fashion therein, for example twelve in number as seen in FIG. 9, when the ball bearings B are deposited through the inlet passage 40. Simply by varying the lengths of the grooves 46, alternative gauge wheels 18 can be provided which require different preset numbers of ball bearings B.

Figure 7:
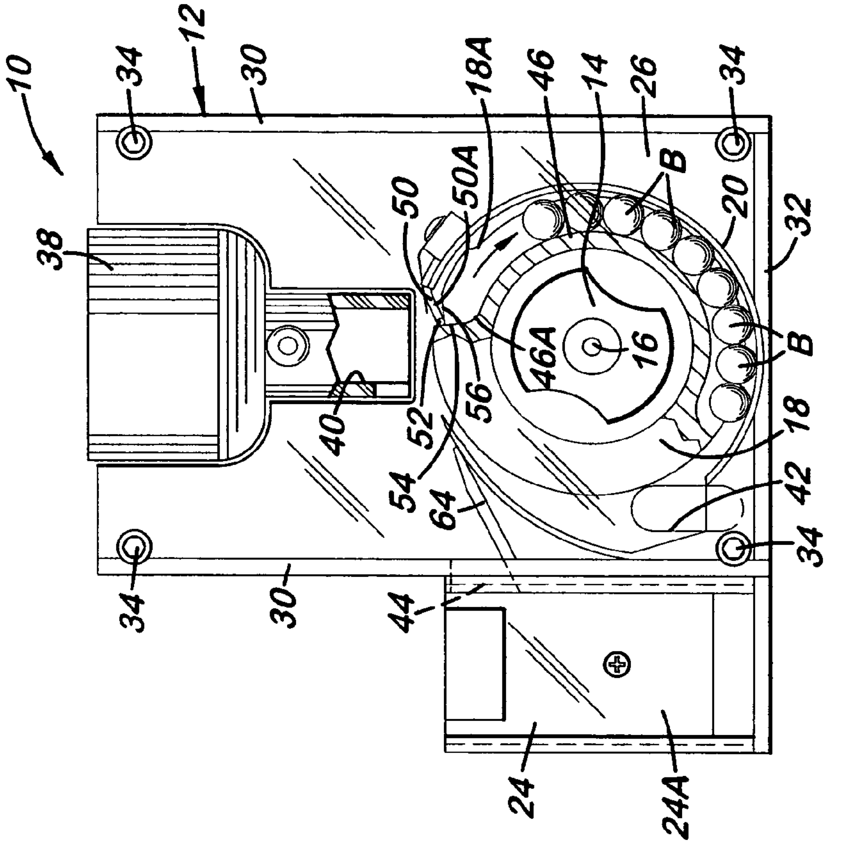
FIGS. 6–10 are side elevational views of the actuation mechanism similar to that of FIG. 3 depicting stages in the operation of the actuation mechanism.
Figure 6:
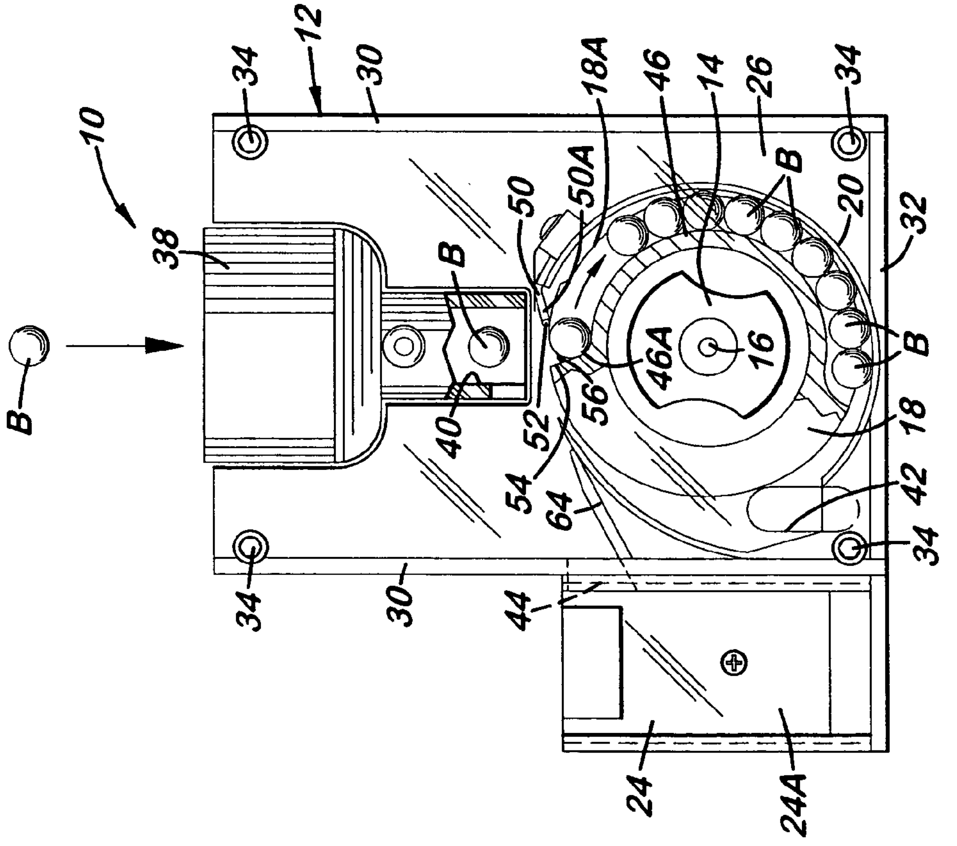
Figure 8:
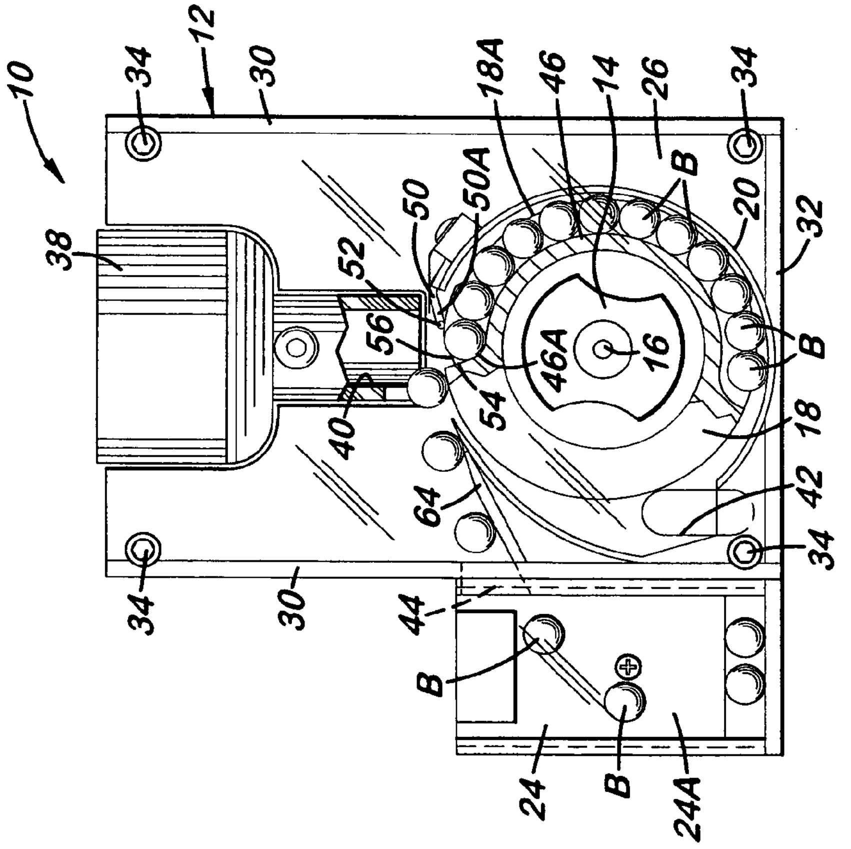
Figure 10:
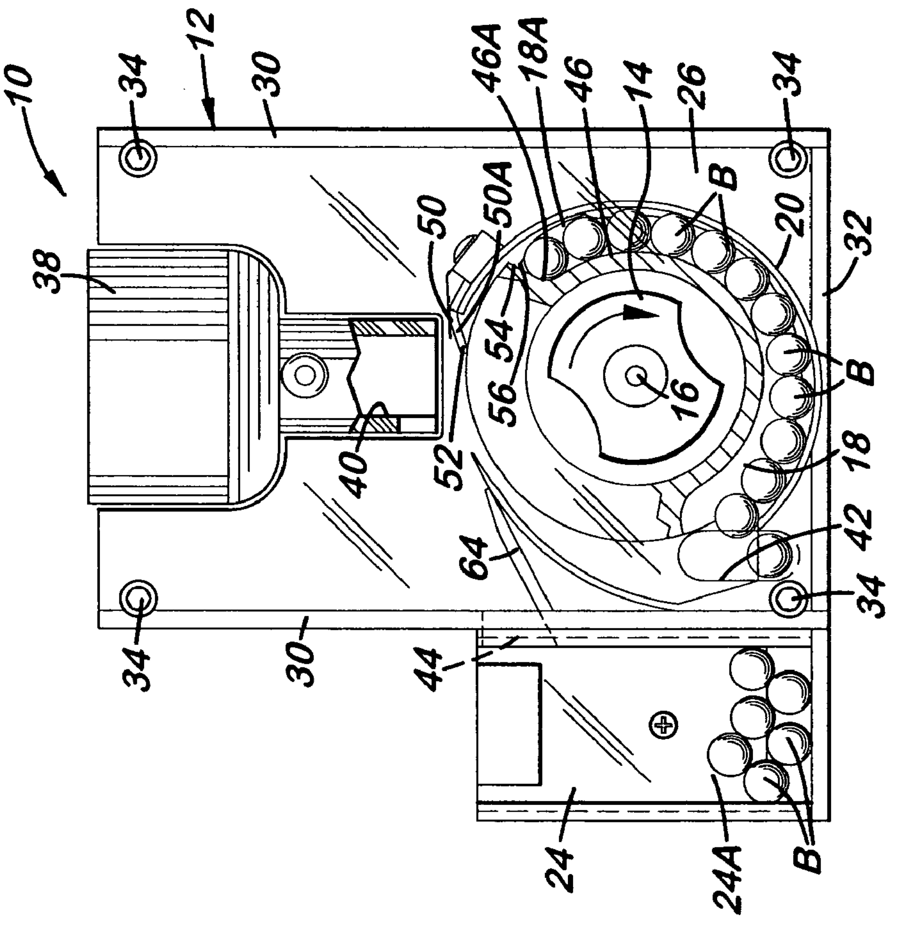

The actuation mechanism 10 also includes a spring-biased detent or finger 50 mounted to the curved retainer wall 20 and extending therefrom outwardly and downwardly toward an inlet end 46A of the peripheral groove 46 in the gauge wheel 18 disposed below the inlet passage 40 of the hopper 38. The detent or finger 50 can flex and has a transverse rod 52 affixed across an end 50A of the finger 50 so as to ride on opposite peripheral edges 18A of the gauge wheel 18 running along opposite sides of the groove 46. If the handle 14 and shaft 16 therewith are turned before the groove 46 is filled with the preset number of ball bearings B, such as is shown in FIG. 7, the rod 52 on the detent 50 will be able to ride downward into notches 56 formed in the peripheral edges 18A of the gauge wheel 18 at the inlet end 46A of the groove 46 and make abutting engagement with a transverse shoulder 54 formed by the notches 56 on the periphery of the gauge wheel 18. Such engagement prevents the handle 14 from being further turned without the required preset number of ball bearings B. The handle 14, shaft 16 and gauge wheel 18 must then be reverse rotated to retract the rod 52 on the finger 50 from the notches 56 and away from the shoulder 54 to provide sufficient space to allow the additional ball bearings B to enter the groove 46 until it is filled, as shown in FIG. 8. It will be noted in FIG. 9 that, as the handle 14, shaft 16 and gauge wheel 18 are rotated in the desired direction the final ball bearing B will prevent the rod 52 from substantially engaging the shoulder 54 by causing the rod 52 to ride thereover so as to not prevent further turning of the gauge wheel 18. The continued turning of the handle 14 and gauge wheel 18 therewith as shown in FIG. 10 will push or carry the ball bearings B about the curved retainer wall 20 which results in their being dispensed one at a time from the outlet opening 42 as shown in FIG. 10.

Figure 5:
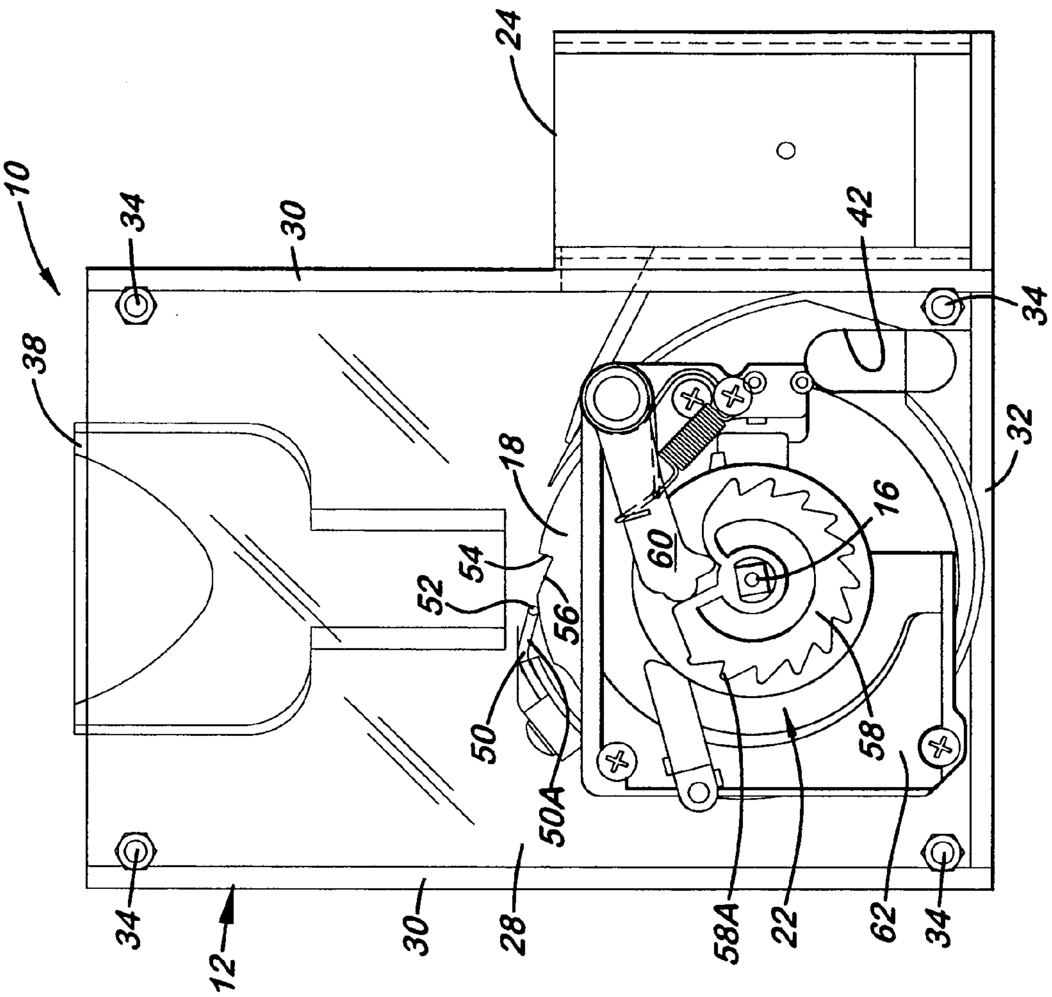
FIG. 5 is a rear side elevational view of the actuation mechanism as seen along line 5—5 of FIG. 1 showing a one-way ratchet device thereon.
Figure 4:
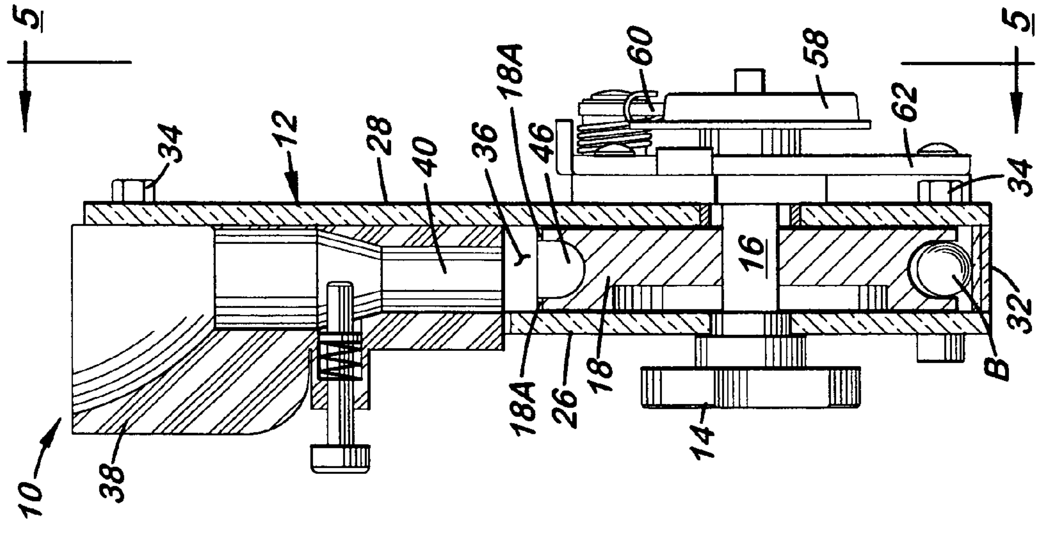
FIG. 4 is a vertical sectional view of the actuation mechanism taken along line 4—4 of FIG. 2 with portions of the actuation mechanism being shown in full.

As seen in FIGS. 4 and 5, the ratchet 22 includes a ratchet wheel 58 fixedly attached on the shaft 16 at the exterior of the rear wall 28 of the housing 12 and a spring-loaded pawl 60 pivotally mounted to a rear mounting plate 62 affixed to the rear wall 28 of the housing 12. The pawl 60 is disposed adjacent to the ratchet wheel 58 so as to engage the ratchet wheel 58 such that the ratchet wheel 58, handle 14, shaft 16 and a gear (not shown) on the end of the shaft 16 which engages a dispensing mechanism (not shown) can only be turned in one direction once the handle 14 and gauge wheel 18 have turned sufficiently to bring the pawl 60 into engagement with a first notch 58A on the ratchet wheel 58 which then prevents reverse rotation of the handle 14, shaft 16, gauge wheel 18 and gear.

The overflow collection receptacle 24 attached to the housing 12 will receive through the overflow discharge opening 44 in the one side wall 30 of the housing 12 any ball bearings B in excess of the preset number received in and filling the peripheral groove 46 which excess ball bearings B will roll across a ramp 64 mounted in the housing 12 between the gauge wheel 18 and the opening 44, as seen in FIG. 8. The receptacle 24 will collect the excess ball bearings B so that they can be recovered by the user opening a door 24A of the receptacle.

From the foregoing, it can be readily understood that the actuation mechanism 10 is designed to allow a quantity of ball bearings B to be deposited into the actuation mechanism 10 without counting them to ensure that the correct preset number is deposited. Any deposited ball bearings B in excess of the correct preset number are automatically diverted to an overflow location where they are returned to the player.

It is thought that the present invention and many of its advantages will be understood from the foregoing description and it will be apparent that various changes may be made thereto without departing from the spirit and scope of the invention or sacrificing all of its material advantages, the forms hereinbefore described being merely preferred or exemplary embodiments thereof.

The invention claimed is:

1. A ball bearing actuation mechanism for a vending machine, said mechanism comprising:

(a) a housing having an interior chamber, outlet and overflow discharge openings communicating with said interior chamber, and an inlet passage communicating from exteriorly of said housing to said interior chamber so as to permit deposit of ball bearings one-at-a-time into said interior chamber via said inlet passage;

(b) a gauge wheel rotatably mounted in said interior chamber of said housing below said inlet passage and adjacent to said outlet and overflow discharge openings of said housing, said gauge wheel being circular in shape and having a peripheral groove defined about a peripheral portion of said gauge wheel;

(c) a retainer wall having a curved configuration and stationarily mounted to said housing in said interior chamber adjacent to and spaced from said peripheral groove of said gauge wheel so as to overlie said peripheral groove and form a channel between said peripheral groove and said retainer wall which extends between said inlet passage and said discharge outlet opening of said housing, said peripheral groove having a predetermined length preset to receive a preset number of ball bearings in single file fashion therein when the ball bearings are deposited into said interior chamber via said inlet passage such that any ball bearings above said preset number deposited into said inlet passage of said housing will divert to said overflow discharge outlet of said housing; and (d) means for rotating said gauge wheel in a predetermined one direction extending from said inlet passage to said discharge outlet opening of said housing in response to deposit of ball bearings equal to said preset number thereof in said channel such that the preset number of ball bearings move with said gauge wheel and discharge from said channel through said discharge outlet opening in said housing.

2. The actuation mechanism of claim 1 wherein said means for rotating said gauge wheel includes:

an elongated shaft rotatably mounted to and extending through said housing and across said interior chamber thereof, said gauge wheel being disposed over and fixedly mounted to said shaft for undergoing rotation with said shaft; and a handle attached to one end of said shaft at one exterior side of said housing, said handle for gripping and turning to rotate said shaft.

3. The actuation mechanism of claim 2 wherein said means for rotating said gauge wheel further includes:

a ratchet wheel fixedly attached on another end of said shaft opposite said one end thereof and at another exterior side of said housing opposite said one exterior side thereof;

a mounting plate affixed to said another exterior side of said housing; and a spring-loaded pawl pivotally mounted to said mounting plate and disposed adjacent to said ratchet wheel so as to engage said ratchet wheel such that said ratchet wheel, handle, shaft and gauge wheel can only be turned in said one direction once said handle, shaft and gauge wheel have turned sufficiently to bring said pawl into engagement with a first notch on said ratchet wheel which then prevents reverse rotation of said ratchet wheel, handle, shaft and gauge wheel.

4. The actuation mechanism of claim 2 wherein said housing includes:

upright front and rear walls;

upright opposite side walls extending between and connected to said front and rear walls; and a horizontal bottom wall extending between and connected to said front, rear and side walls such that said walls of said housing together form said interior chamber.

5. The actuation mechanism of claim 4 wherein said shaft extends transversely through said front and rear walls of said housing.

6. The actuation mechanism of claim 4 further comprising:

a hopper supported on said housing between upper portions of said front and rear walls thereof and defining said inlet passage.

7. The actuation mechanism of claim 1 further comprising:

an overflow collection receptacle disposed adjacent to said overflow discharge opening of said housing for receiving in said receptacle any ball bearings above said preset number thereof deposited into said inlet passage of said housing and exiting said interior chamber through said overflow discharge opening of said housing.

8. The actuation mechanism of claim 1 further comprising:

means for preventing rotation of said gauge wheel until the number of ball bearings equal to said preset number thereof fill said channel.

9. The actuation mechanism of claim 8 wherein said means for preventing rotation of said gauge wheel is a spring-biased detent mounted adjacent to an end of said retainer wall and extending therefrom toward an inlet end of said peripheral groove in said gauge wheel.

10. The actuation mechanism of claim 9 wherein said detent includes:

a finger mounted adjacent to said end of said retainer wall and extending therefrom toward said inlet end of said peripheral groove in said gauge wheel, said finger being spring biased to move toward said peripheral groove; and a rod-like element affixed transversely across an end of said finger so as to ride on opposite peripheral edges of said gauge wheel running along opposite sides of said peripheral groove such that if said gauge wheel is rotated before said peripheral groove is filled with said preset number of ball bearings said element on said finger will ride downward into notches formed in said peripheral edges of said gauge wheel at said inlet end of said groove and make abutting engagement with a transverse shoulder formed by said notches whereby such engagement prevents further rotation of said gauge wheel without said preset number of ball bearings filling said peripheral groove so that said gauge wheel must then be reverse rotated to retract said element on said finger from said notches and away from said shoulder to provide sufficient space to allow additional ball bearings to enter said peripheral groove until said preset number of ball bearings fill said peripheral groove whereupon rotation of said gauge wheel in said one direction the last one of the ball bearings filling said peripheral groove will cause said element to ride over the last one ball bearing and said shoulder so as to not prevent further rotation of said gauge wheel which will carry said preset number of ball bearings in said channel and along said retainer wall resulting in the ball bearings being dispensed one at a time from said discharge outlet opening of said housing.

* * * * *